US012038513B1

United States Patent
Rao et al.

(10) Patent No.: US 12,038,513 B1
(45) Date of Patent: Jul. 16, 2024

(54) SYSTEM AND METHOD FOR IMPROVING POSITIONING ACCURACY OF GLOBAL NAVIGATION SATELLITE SYSTEM DEVICES

(71) Applicant: Zephr.xyz Inc., Louisville, CO (US)

(72) Inventors: Pramukta Rao, Potomac, MD (US); Sean Gorman, Louisville, CO (US); Scott Nelson, Louisville, CO (US); Kostas Stamatiou, Boulder, CO (US)

(73) Assignee: ZEPHR.XYZ INC., Louisville, CO (US)

( * ) Notice: Subject to any disclaimer, the term of this patent is extended or adjusted under 35 U.S.C. 154(b) by 0 days.

(21) Appl. No.: 18/297,005

(22) Filed: Apr. 7, 2023

(51) Int. Cl.
| G01S 19/21 | (2010.01) |
| G01S 19/20 | (2010.01) |
| G01S 19/22 | (2010.01) |

(52) U.S. Cl.
CPC .............. *G01S 19/21* (2013.01); *G01S 19/20* (2013.01); *G01S 19/22* (2013.01)

(58) Field of Classification Search
None
See application file for complete search history.

(56) References Cited

U.S. PATENT DOCUMENTS

| 9,596,570 | B1* | 3/2017 | Cardoso de Moura ................... H04L 67/52 |
| 2015/0065159 | A1 | 3/2015 | Alpert et al. |
| 2021/0318451 | A1 | 10/2021 | Wang et al. |
| 2022/0057530 | A1* | 2/2022 | Wang ...................... G01S 19/04 |
| 2022/0283314 | A1* | 9/2022 | Luo ......................... G01S 19/07 |

FOREIGN PATENT DOCUMENTS

| CA | 3179881 | A1 * | 10/2021 | ............. G01S 19/12 |

* cited by examiner

*Primary Examiner* — Adolf Dsouza
(74) *Attorney, Agent, or Firm* — Galvin Patent Law LLC; Brian R. Galvin

(57) ABSTRACT

Global Navigation Satellite System (GNSS) accuracy improvement for GNSS-equipped mobile end user devices using error corrections calculated from the location information of other GNSS-equipped mobile end user devices. An algorithm in which GNSS signal data received by a network of GNSS-equipped mobile end user devices is collected and sent to a GNSS location correction engine, which calculates an ensemble error correction for the network and transmits the error correction to the GNSS-equipped mobile end user devices in the network. Implementations of the system and method may include selection of subsets of devices for inclusion in the calculations based on device location, time, hardware, and other factors.

9 Claims, 13 Drawing Sheets

SYSTEM AND METHOD FOR IMPROVING POSITIONING ACCURACY OF GLOBAL NAVIGATION SATELLITE SYSTEM DEVICES

CROSS-REFERENCE TO RELATED APPLICATIONS

None.

BACKGROUND OF THE INVENTION

Field of the Art

The present invention is in the field of global navigation satellite systems (GNSS), and more particularly in the field of increasing accuracy of positioning in consumer-grade GNSS devices.

Discussion of the State of the Art

Commercial-grade GNSS devices such as surveying equipment are capable of centimeter-level positioning precision. These commercial-grade devices are typically capable of less-then-meter-level precision on their own because they are purpose-built devices with antennas, receivers, processors, software/firmware, and power sources designed specifically to enable such precision and are typically used for surveying purposes where they are held in a stationary position for extended periods of time. When combined with error correction from base stations of known locations, commercial-grade GNSS devices can provide positional accuracy as low as 1 cm to 5 cm.

To date, consumer-grade devices are unable to achieve a similar level of precision. Positional accuracy of such devices is limited due to constraints in each of these areas (antennas, receivers, processors, software/firmware, and power sources) resulting from cost concerns, design priorities, lack of specialization of the device, and other issues inherent in the design, production, and sale of consumer-grade devices. Further, consumer-grade devices are often used for locational purposes while in motion, such as during vehicle navigation, which reduces positional accuracy. As a result, consumer-grade devices have GNSS accuracies on the order of several meters. This low level of accuracy greatly limits the uses to which consumer-grade GNSS devices can be put.

What is needed is a system and method for increasing the accuracy of positioning in GNSS devices, and particularly consumer-grade GNSS devices, without requiring the purpose-built components and designs of commercial-grade GNSS devices and the use of base stations with known positions.

SUMMARY OF THE INVENTION

Accordingly, the inventor has conceived and reduced to practice, a system and method for Global Navigation Satellite System (GNSS) accuracy improvement for GNSS devices using error corrections calculated from the location information of other GNSS devices. The system and method involve use of an algorithm wherein GNSS signal data received by a network of GNSS devices is collected and sent to a GNSS location correction engine, which calculates an ensemble error correction for the network and transmits the error correction to the GNSS devices in the network. Implementations of the system and method may include selection of subsets of devices for inclusion in the calculations based on device location, time, hardware, and other factors.

According to a preferred embodiment, a method for improving positional accuracy in a Global Navigation Satellite System (GNSS) device is disclosed, comprising the steps of: receiving positional information from a plurality of GNSS devices, the positional information comprising navigation message data from each device comprising an error correction to be applied by that device to correct its calculated physical location; selecting a subset of the plurality of GNSS devices, wherein the subset is selected based on similarity of one or more characteristics with a target GNSS device; calculating an error correction for the target GNSS device based on the positional information of the devices in the subset; and sending the error correction to the target GNSS device.

According to an aspect of an embodiment, the method further comprises the steps of: sending the positional information to a cloud-based service; using computing resources of the cloud-based service to solve an optimization problem for the subset using the positional information of the devices in the subset which, when solved, converges on the true value of the distance from a known location of one of the plurality of GNSS devices to the target GNSS device; calculating the error correction for the target GNSS device based on the solution to the optimization problem; and sending the error correction to the target GNSS device.

According to an aspect of an embodiment, the calculation of a location correction for any device in the subset affects calculation of the locations of the remainder of the GNSS devices in the subset.

According to an aspect of an embodiment, the method further comprises the steps of: connecting the plurality of GNSS devices into a decentralized, peer-to-peer network; calculating the error correction for the target GNSS device on one or more of the plurality of GNSS devices; and distributing the error correction to each of the other GNSS devices of the plurality of devices and to the target GNSS device.

According to an aspect of an embodiment, the method further comprises the steps of: connecting the plurality of GNSS devices into a decentralized, peer-to-peer network; calculating a first portion of the error correction for the target GNSS device on one or more of the plurality of GNSS devices; calculating a second portion of the error correction on the cloud-based service; combining the first and second portions of the error correction into the error correction; and sending the error correction to the target GNSS device.

According to an aspect of an embodiment, the target device is one of the plurality of GNSS devices.

According to an aspect of an embodiment, the target device is not one of the plurality of GNSS devices.

According to an aspect of an embodiment, the positional information further comprises the device's calculated physical location.

According to an aspect of an embodiment, the positional information further comprises information from an inertial measurement unit (IMU) on each device.

BRIEF DESCRIPTION OF THE DRAWING FIGURES

DETAILED DESCRIPTION OF THE DRAWING FIGURES

Figure 1:
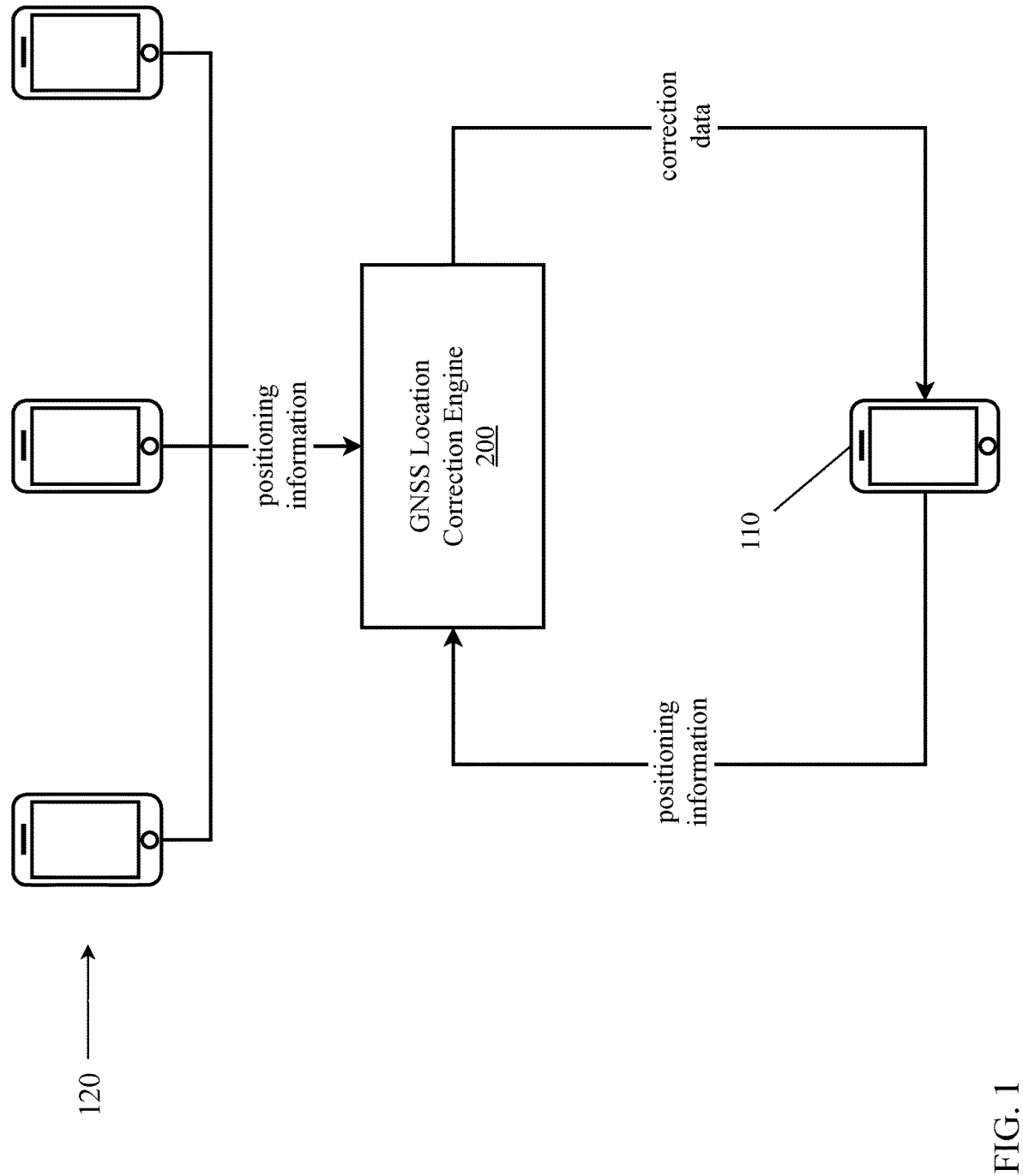
FIG. 1 is a block diagram illustrating an exemplary system architecture for a GNSS accuracy improvement system.

The inventor has conceived, and reduced to practice, a system and method for Global Navigation Satellite System (GNSS) accuracy improvement for GNSS devices using error corrections calculated from the location information of other GNSS devices. The system and method involve use of an algorithm wherein GNSS signal data received by a network of GNSS devices is collected and sent to a GNSS location correction engine, which calculates an ensemble error correction for the network and transmits the error correction to the GNSS devices in the network. Implementations of the system and method may include selection of subsets of devices for inclusion in the calculations based on device location, time, hardware, and other factors.

Today, commercial-grade GNSS devices are capable of 1 cm to 5 cm accuracy in good conditions. These systems use the normal code phase timing data that is universally available, along with carrier phase data and correction information provided from known reference sources (also known as base stations) whose locations are known with a great deal of precision. Commercial-grade GNSS receivers are purpose-built devices with well-calibrated geodetic antennas, receivers, processors, software/firmware, and power sources specifically engineered to minimize hardware interference and other sources of error, and maximize the accuracy of GNSS positioning. They are typically used for surveying purposes where they are held in a stationary position for extended periods of time which also maximizes positional accuracy. When combined with error correction from base stations of known locations, commercial-grade GNSS devices can provide positional accuracy as low as 1 cm to 5 cm.

Consumer-grade GNSS devices, on the other hand, are designed and built with many compromises that reduce the accuracy of GNSS positioning. As they are consumer-grade devices, the retail price of the device is a major consideration, leading to compromises in hardware component selection. Size is also a major consideration, reducing the space on the device available for antennas and power sources and dictating their location, which is typically sub-optimal for GNSS purposes. Further, the vast majority of consumer-grade GNSS devices in use are mobile phones, which are multi-purpose devices of which GNSS positioning is only one. The multi-purpose nature of mobile phones leads to further design compromises as the GNSS capabilities of the device must compete with other functions of the device for device resources such as space on the device, processing power, and battery life. As a result, consumer-grade GNSS devices are typically capable of GNSS positioning accuracy only on the order of several meters to tens of meters.

A particular example of lower-grade componentry in consumer-grade GNSS devices are the inexpensive GNSS antennas in mobile phones. Mobile phones use an omnidirectional linearly or elliptically polarized antenna due to the unknown orientation of the phone in three-dimensional space. These antennas have advantages in terms of received signal strength and the number of received signals, but have low gain and are very sensitive to multipath effects, which is non-optimal for GNSS positioning purposes. Other phone components, like the screen of the device and other transmitting antennas (Wi-Fi, Bluetooth), affect the smartphone antenna, leading to reception pattern irregularities for which correction is difficult.

In order to achieve centimeter-level positioning on consumer-grade GNSS devices, corrections to positioning data must account for both device-specific sources of error and non-device-specific sources of error. Non-device-specific sources of error include traditional sources of error (e.g., errors associated with ephemeris, clocks and timing, satellite health, ionospheric corrections, and satellite constellation changes) which are addressed by GNSS systems using data from ground-based external reference stations. Corrections are made based on the reference stations and transmitted from stations on the ground to the satellites, which transmit the corrections to GNSS devices as part of the navigation message data emitted by each satellite. Further accuracy in commercial-grade GNSS devices can be obtained by receipt of data directly from an external reference station (i.e., a base station). For example, traditional Differential GPS (DGPS) and Real Time Kinematic (RTK) correction schemes take advantage of spatial correlations in atmospheric errors between a nearby fixed reference station with known position and a mobile commercial-grade GNSS device, in order to enable the commercial-grade GNSS device to correct its position to centimeter level. Network RTK enhances this by using a central processing station to aggregate and interpolate data from multiple reference stations and can provide a virtual reference signal that appears to originate near client GNSS units. With a network connection, it is also possible to compute a GNSS fix server side, simply by transmitting the raw measurements to a server, and having the server run appropriate algorithms on the received data. Alternatively, instead of relying on data from reference stations, Precise Point Positioning (PPP) techniques can be used to achieve similar levels of accuracy by relying on precise information about satellite orbits and clocks, along with accurate error models. Traditionally, these models suffer from a longer initial convergence period than differential techniques. Consumer-grade GNSS devices do not have the capability of receiving corrections for these sources of error from a base station. Even if the correction for traditional sources of error was provided to a consumer-grade GNSS device (e.g., via the Internet), it may or may not be sufficiently timely to provide greater accuracy on these devices due to the frequent movement of consumer-grade GNSS devices (e.g., mobile phones) while in use versus commercial-grade GNSS devices (e.g., surveying equipment).

Device-specific sources of error are often a larger source of error and are more difficult to correct for. Device-specific sources of error are due to the location, design, or orientation of the GNSS device, and include such things as multi-path errors, antenna calibration errors (e.g., phase center offsets), antenna orientation errors, non-GNSS hardware interference errors, and carrier-phase cycle slips. Device-specific sources of error are typically addressed by on-device calculations and corrections (e.g., multi-path filtering, carrier-phase cycle slip detection, etc.), and are significantly greater for consumer-grade GNSS devices because of the design constraints discussed above.

However, both device-specific and non-device-specific sources of error are highly correlated across devices, either due to spatial proximity, or device type/composition, creating opportunities for correction other than the traditional methods of external reference stations and on-device corrections. More specifically, error corrections known or calculated for one GNSS device can be applied to another GNSS device with similar characteristics such as geographical proximity, device type, operating system, antenna type, GNSS chipset, device orientation, device movement, etc. Moreover, the error corrections known or calculated for individual devices can be combined into larger collective optimization problems that solve for the location of groups of devices, along with universal, device specific, location-specific, and satellite specific errors/calibrations/correlations.

The methodology described herein uses ensemble data from a plurality of devices to estimate common error parameters across devices. Where there is a large number of GNSS devices providing data, robust estimation techniques become viable options for removing sources of error across all devices or across selected subsets of devices with similar characteristics. The result is a system and method that can provide centimeter-level GNSS positional accuracy on a network of consumer-grade GNSS devices.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Commercial-grade GNSS device" or "commercial-grade device" as used herein means a GNSS-capable device typically sold to and used by professionals (e.g., surveyors) for a commercial purpose, wherein positional accuracy of the device is a fundamental concern in the device's design. Commercial-grade GNSS devices will typically be designed and built for a specific purpose (e.g., surveying).

"Consumer-grade GNSS device" or "consumer-grade device" as used herein means a GNSS-capable device typically sold to and used by non-professionals (i.e., ordinary consumers), wherein positional accuracy is not a fundamental concern in the design of the device. Consumer-grade GNSS devices may be designed and built for a specific purpose (e.g., running and cycling computers), but the majority of consumer-grade GNSS devices currently in use are multi-purpose devices (e.g., mobile phones).

"Global Navigation Satellite System" and "GNSS" as used herein mean any system having a planet-orbiting satellite constellation that provides positioning, navigation, and timing (PNT) services. Examples of currently-existing GNSSs are the U.S. Global Positioning System (GPS), the Russian GLONASS system, the European Galileo system, the Chinese BeiDou system, the Indian IRNSS system, and the Japanese QZSS system.

"Global Positioning System" and "GPS" are used herein generically to mean any GNSS system, except where the context indicates that the terms refers specifically to the U.S. GPS system.

"GNSS device" and "GNSS-capable device" as used herein mean any device that is capable of receiving signals from one or more GNSS satellites and determining a location of the GNSS device using the received signals.

"Navigation message data" as used herein means data transmitted from satellites of a GNSS containing information for calculating a position of a GNSS device which receives the data. In current GNSS implementations, navigation message data comprises ephemeris parameters (allowing computation of the satellite's coordinates), time parameters and clock corrections (allowing computation of satellite clock offsets and time conversions), service parameters (containing information about the health of the satellite and the navigation data set used), ionospheric parameters (needed by single frequency receivers), and almanacs (allowing rough computation of the position of other satellites in the constellation for purposes of signal acquisition).

DETAILED DESCRIPTIONS OF THE DRAWING FIGURES

FIG. 1 is a block diagram illustrating an exemplary system architecture for a GNSS accuracy improvement system. In this example, a network of GNSS devices 110, 120 provides positioning information to a GNSS location correction engine 200. The positioning information comprises one or more of the following types of information: navigation message data received by the device from GNSS satellites, calculated locations of the device from the navigation message data, positioning corrections calculated on the device, positioning corrections received from a source other than the device (e.g., the Internet), and/or other sensor data from the GNSS device such as acceleration, orientation, and direction information from on-board inertial measurement units (IMU) comprising one or more of accelerometers, gyroscopes, and/or magnetometers. Positioning information from the devices in the network 110, 120, or a selected subset of devices in the network, is sent to GNSS location correction engine 200 and stored as current and prior location estimates for the devices in the network 110, 120. GNSS location correction engine 200 estimates positional accuracy errors using an ensemble computational model which selects a subset of the device signals for computation based on similarity characteristics of the subset with a first device 110 of the network 110, 120, generates location correction data based on a multi-receiver positioning correction, and sends the location correction data to the first device 110 for correction of its on-board calculations of its location based on the satellite signals it has received. The methodology for correction is shown as being applied to the first device 110 for illustrative purposes, but this illustration is not intended to be limiting, and the same methodology may be applied to any GNSS device in the network of devices 110, 120. Further, the term "network" of GNSS devices is used broadly to describe any set of GNSS devices configured to share positioning information either with each other or with a cloud-based service for purposes of implementing the positional correction methodology described herein. There is no requirement that devices within the network act identically to one another. For example, some devices may be configured to provide positioning information only, others may be configured to receive correction data only, and still others may be configured to both provide positioning data and receive correction data.

The methodology described herein allows for correction of location information on GNSS devices with positional accuracy of less than a meter without requiring communication with fixed reference points (i.e., base stations), allowing consumer-grade GNSS devices to provide positional accuracy on par with that of commercial-grade GNSS devices, and potentially allowing future commercial-grade GNSS devices to be designed and built at a lower cost with the same or better positional accuracy. As will be discussed below, this conceptual architecture may be implemented in any number of configurations with GNSS location correction engine being located on the devices in the network 110, 120, on a cloud-based service or services, or a combination of the two, depending on factors such as device capabilities, positional accuracy requirements, network availability, bandwidth constraints, and load balancing considerations.

Figure 2:
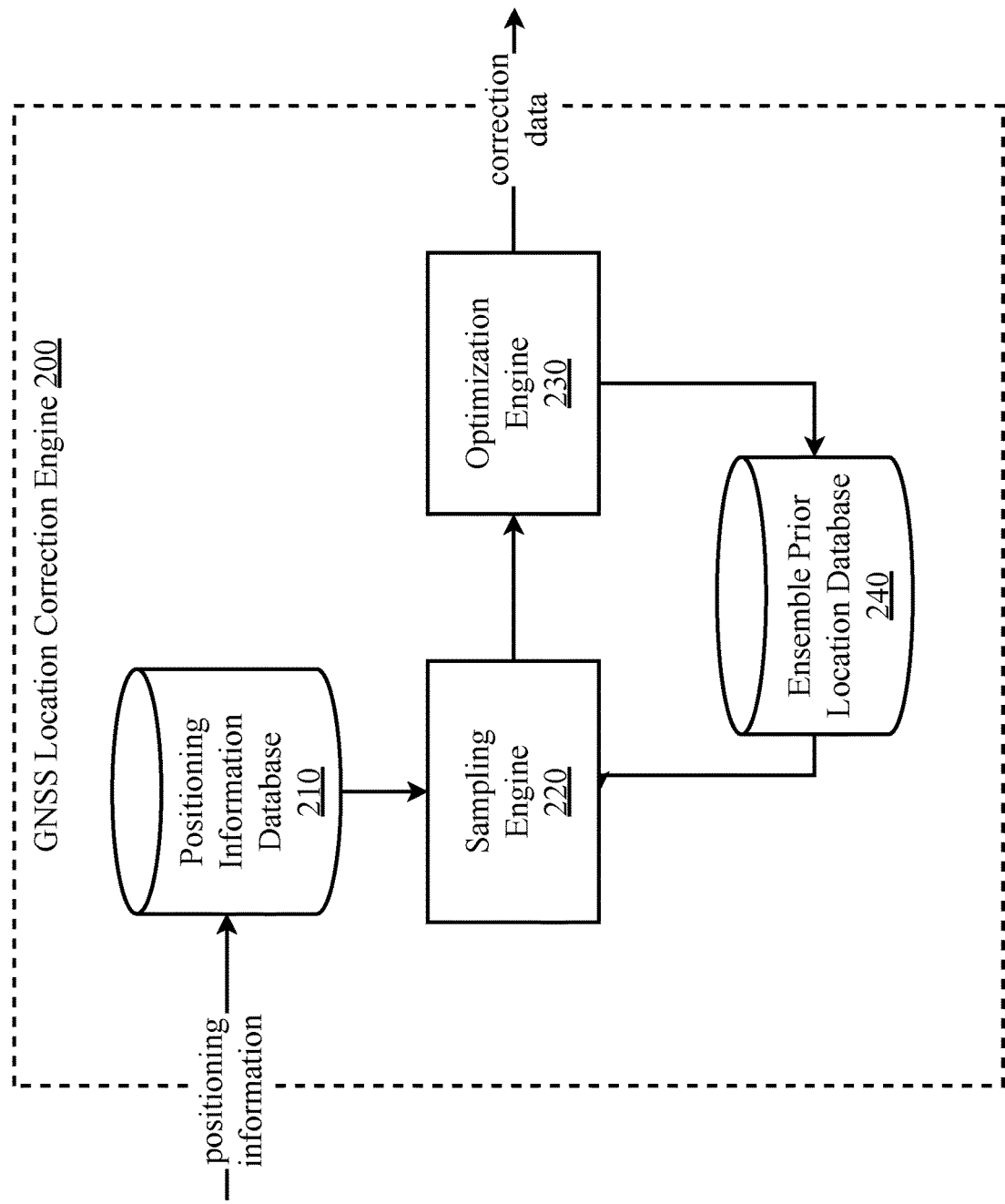
FIG. 2 is a block diagram illustrating an exemplary GNSS location correction engine aspect of a GNSS accuracy improvement system.

FIG. 2 is a block diagram illustrating an exemplary GNSS location correction engine aspect of a GNSS accuracy improvement system. In this example, GNSS location correction engine 200 comprises a positioning information database 210, a sampling engine 220, an optimization engine 230, and an ensemble prior location database 240.

Positioning information database 210 receives and stores positioning information from devices in the network of GNSS devices 110, 120.

Sampling engine 220 selects a subset of the device signals for computation based on similarity characteristics of the subset with a first device 110 of the network 110, 120. While non-device-specific sources of error (e.g., errors associated with ephemeris, clocks and timing, satellite health, ionospheric corrections, and satellite constellation changes) are corrected at the GNSS system level, device-specific sources of error are often a larger source of error and are more difficult to correct for. Device-specific sources of error are due to the location, design, or orientation of the GNSS device, and include such things as multi-path errors, antenna calibration errors (e.g., phase center offsets), antenna orientation errors, non-GNSS hardware interference errors, and carrier-phase cycle slips. Device-specific sources of error are typically addressed by on-device calculations and corrections (e.g., multi-path filtering, carrier-phase cycle slip detection, etc.), and are significantly greater for consumer-grade GNSS devices because of the design constraints discussed above.

Fortunately, both device-specific and non-device-specific sources of error are highly correlated across devices, either due to spatial proximity, or device type/composition, creating opportunities for correction other than the traditional methods of external reference stations and on-device corrections. More specifically, error corrections known or calculated for one GNSS device can be applied to another GNSS device with similar characteristics such as geographical proximity, device type, operating system, antenna type, GNSS chipset, device orientation, device movement, etc. Moreover, the error corrections known or calculated for individual devices can be combined into larger collective optimization problems that solve for the location of groups of devices, along with universal, device specific, location-specific, and satellite specific errors/calibrations/correlations.

Sampling engine 220 correlates characteristics of a target GNSS device 110 for which location corrections are needed with characteristics of other GNSS devices 120 in the network to determine which of other GNSS devices 120 would be most predictive of the corrections needed to provide accurate positioning of target GNSS device 110. A number of correlation algorithms may be used. As an example, a simple correlation algorithm would select a subset of other GNSS devices 120 having the greatest number of common characteristics with target GNSS device 110 such as geographical proximity, device type, operating system, antenna type, GNSS chipset, device orientation, and device movement. As another example, a more sophisticated algorithm would involve use of machine learning algorithms to select a subset of other GNSS devices 120 which have non-obvious or hidden correlations that prove to be predictive of location accuracy such as speed of movement (e.g., walking speed versus driving speed), device accelerations/decelerations, distances from and signal strength to/from cellular towers, timing and duration of WiFi and Bluetooth transmissions from the device, and similar operational and usage characteristics. Regardless of the algorithm used, the purpose of sampling engine 220 is to select a subset of other GNSS devices 120 in the network which most accurately reflect the corrections that need to be made to target GNSS device 110.

Optimization engine 230 generates the corrections for target GNSS device 110 using the positioning information from the subset of devices selected by sampling engine 220 by applying known or calculated error corrections from each of the subset of devices to first device 110. A number of algorithms may be used. As an example, a simple optimization algorithm would calculate an average error correction across the subset of devices for application to first device 110, which is known to have similar characteristics to the subset by virtue of the subset selection. Another simple optimization algorithm would calculate a weighted error correction across the subset of devices for application to first device 110, wherein certain characteristics of the devices in the subset (e.g., antenna type) are weighted more heavily than others. These simple corrections could be applied by an on-device GNSS location correction engine without the need for centralized processing as might be available via a cloud-based service. An another example, a more sophisticated algorithm would involve solving a multi-receiver positioning problem using positioning information from a plurality of GNSS devices, more detailed information for which is set forth in FIG. 9 and its associated descriptions. In some embodiments, optimization engine may incorporate prior location information from one or more of the subset of GNSS devices which has been previously stored in an ensemble prior location database 240. As described elsewhere herein, in some embodiments, the algorithms used by optimization engine 230 may incorporate inertial measurement unit (IMU) data and other non-GNSS data in determining positional corrections.

Regardless of the particular optimization algorithm used, the result is a system that allows for GNSS corrections for a given device that is not reliant on reference stations (although use of reference stations can be used in some embodiments), and which generates GNSS location corrections from a plurality of other GNSS devices. Optimization using positioning information from a sufficient number of GNSS devices allows for error corrections without external reference stations that provide a positional accuracy greater than could be achieved by attempting to calculate corrections based on a data from a single device. This allows use of a network of consumer-grade GNSS devices to provide positional accuracy greater than any single device of the network would be able to achieve.

Figure 3:
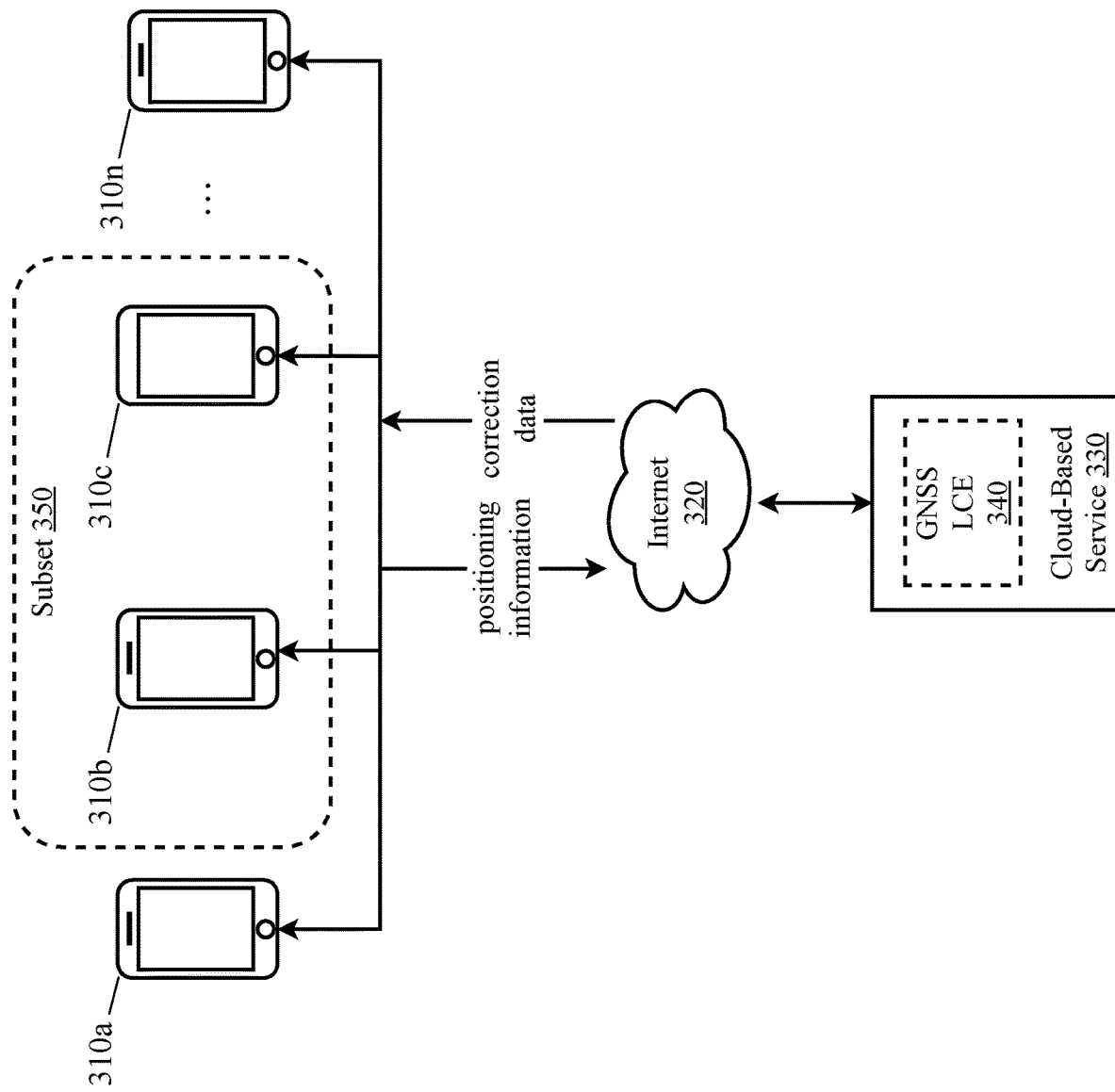
FIG. 3 is a block diagram illustrating an exemplary cloud service network implementation of a GNSS accuracy improvement system.

FIG. 3 is a block diagram illustrating an exemplary cloud service network implementation of a GNSS accuracy improvement system. In this exemplary implementation, GNSS location correction engine 340 is located on a cloud-based service 330, accessible via the Internet 320 by each GNSS device 310*a-n* of in the network. Each device may be configured to send its positioning information to GNSS location correction engine 340 via Internet 320, and receives correction data from GNSS location correction engine 340 via Internet 320. Connections of each device to Internet 320 may be of any appropriate type (e.g., WiFi, cellular data, etc.). Establishment of the network of GNSS devices may be accomplished by installing applications, operating system functionality, or firmware on each device configured to communicate with cloud-based service 330. Subsets 350 of devices (e.g., 310*b, c*) may be selected based on similar characteristics such as geographical proximity, device type, operating system, antenna type, GNSS chipset, device orientation, device movement, etc., as described above. Cloud-based service implementations are advantageous in certain situations such as where on-device GNSS location correction engines are impractical or unavailable (e.g., due to insufficient processing power on mobile GNSS devices to solve complex multi-receiver positioning problems) or where it is preferred that a large number of the GNSS devices 310*a-n* in the network act as sensors by providing positional information only (or even raw GNSS message data only).

Figure 4:
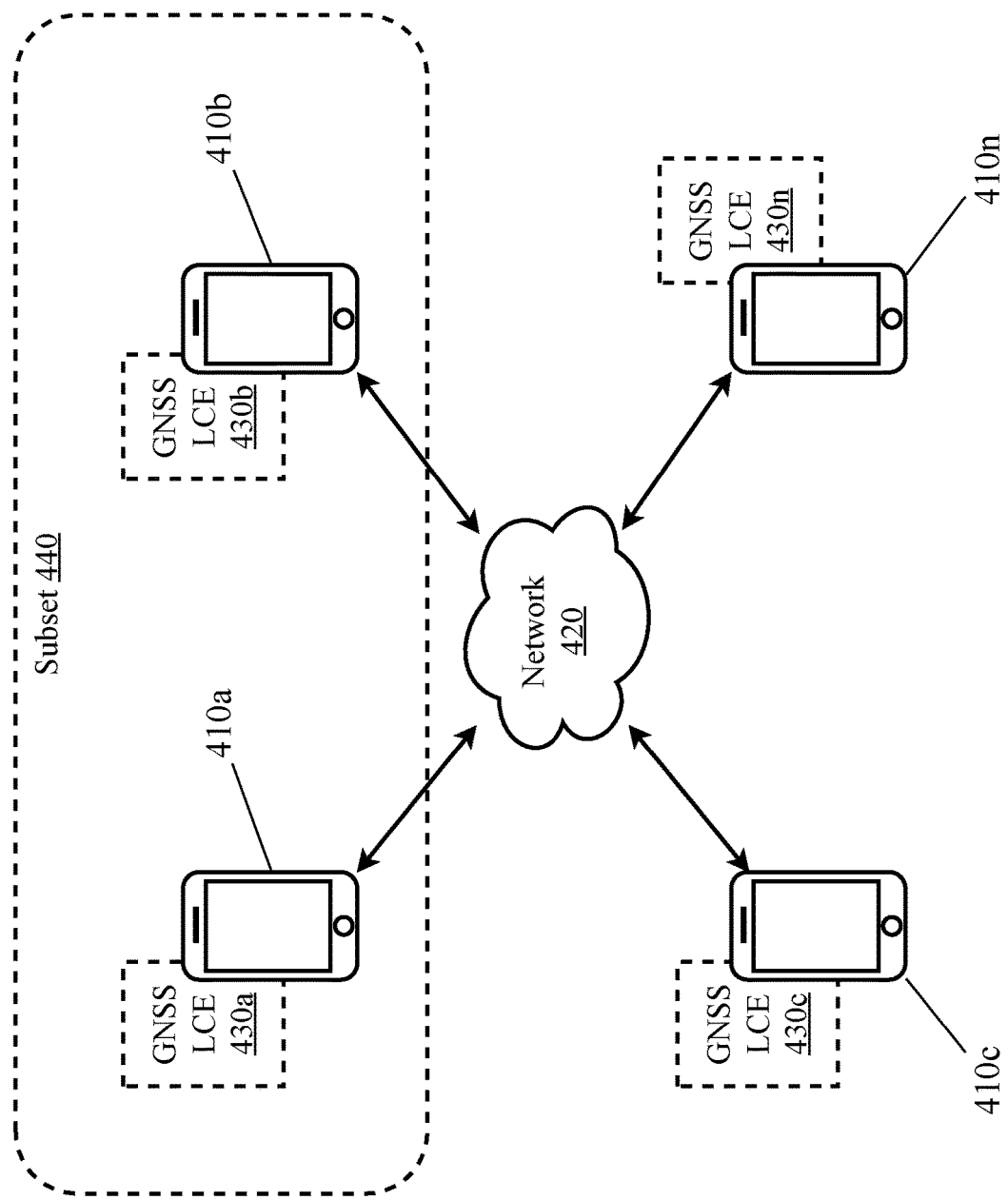
FIG. 4 is a block diagram illustrating an exemplary decentralized, peer-to-peer network implementation of a GNSS accuracy improvement system.

FIG. 4 is a block diagram illustrating an exemplary decentralized, peer-to-peer network implementation of a GNSS accuracy improvement system. In this exemplary implementation, a GNSS location correction engine (GNSS LCE) 430*a-n* is located on each GNSS device 410*a-n* of a network of GNSS devices. Each device is accessible to each other device via a network 420 which may be of any type appropriate to the implementation (e.g., local area network (LAN), wide area network (WAN), Internet-based). Each device may be configured to send its positioning information to other devices in the network via network 420, which may be to all devices 410*a-n* or a subset 440 of devices 410*a, b*. Each device may be configured to perform its own on-device error calculations based on the positioning information received from other devices (as well as its own positioning information), and may be configured to send out correction data to other devices via network 420, which may be to all devices 410*a-n* or a subset 440 of devices 410*a, b*. Error corrections received by each device may be incorporated into that device's next on-device calculations along with positioning information. In this manner, positional accuracy of each device in the network (or subset) is improved through iterative improvements in error corrections across the devices 410*a-n* (or subset 440 of devices 410*a, b*). Connections of each device to network 420 may be of any appropriate type (e.g., Bluetooth, WiFi, cellular data, etc.). Establishment of the network of GNSS devices may be accomplished by installing applications, operating system functionality, or firmware on each device configured to communicate with other devices via network 420. Subsets 440 of devices (e.g., 410*a, b*) may be selected based on similar characteristics such as geographical proximity, device type, operating system, antenna type, GNSS chipset, device orientation, device movement, etc., as described above. Peer-to-peer implementations are advantageous in certain situations such as when devices may not be connected to the Internet for security reasons (e.g., certain military applications), when network connections are intermittent or bandwidth is limited and on-device processing of error corrections is preferable (e.g., work in remote locations), or where decentralization is preferred to eliminate reliance on a centrally-controlled system or to provide network resilience through redundancy.

Figure 5:
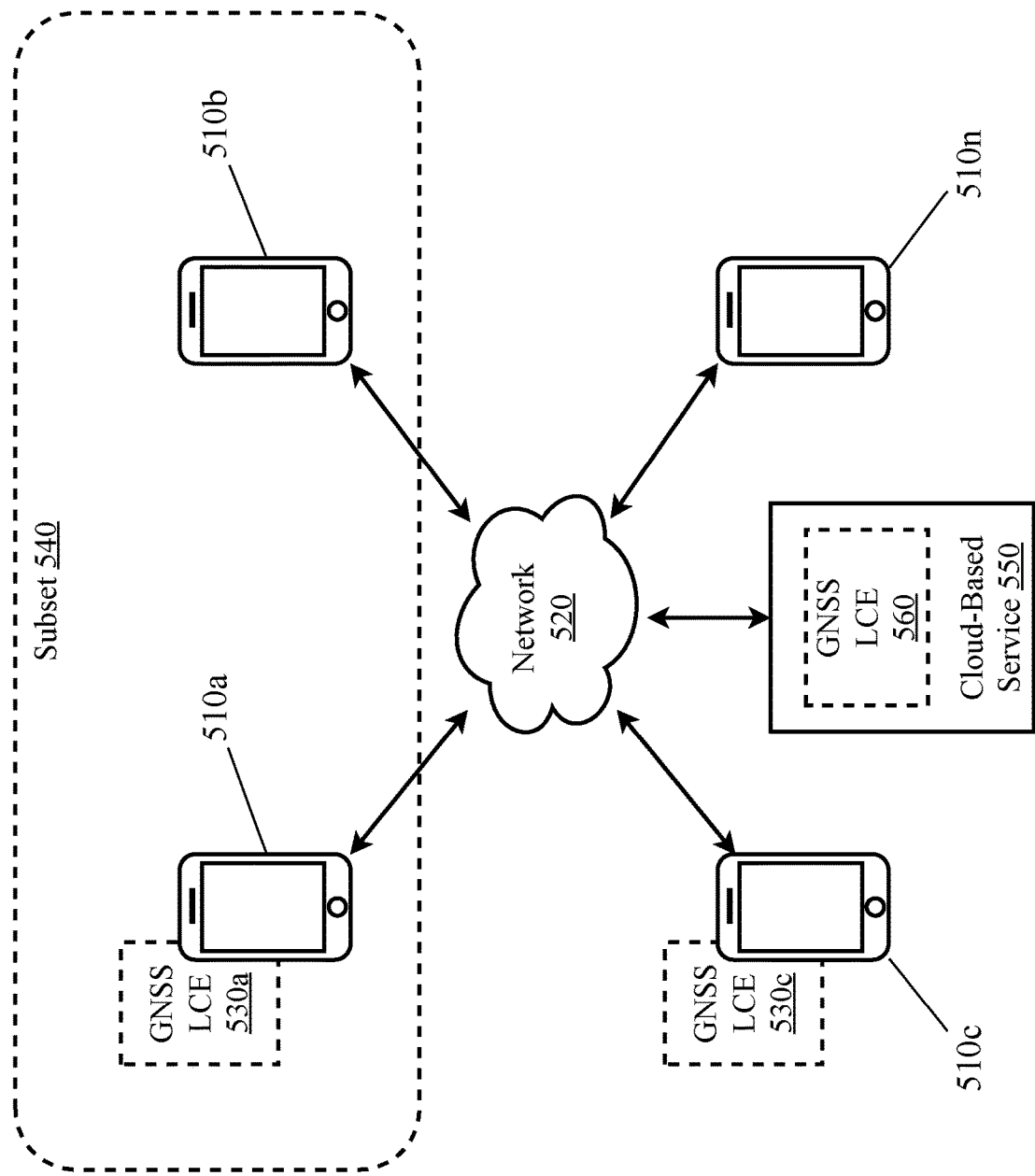
FIG. 5 is a block diagram illustrating an exemplary hybrid network implementation of a GNSS accuracy improvement system.

FIG. 5 is a block diagram illustrating an exemplary hybrid network implementation of a GNSS accuracy improvement system. In this exemplary implementation, GNSS location correction engines (GNSS LCEs) 530*a, c* are located on some GNSS devices 510*a, c* and on a cloud-based service 550. Some devices 510*b, n* do not have an on-device GNSS location correction engine. Some or all of the devices 510*a-n* are accessible to one another via a network 520 which may be of any type appropriate to the implementation (e.g., local area network (LAN), wide area network (WAN), Internet-based). Each device may be configured to send its positioning information to other devices via network 520, which may be to all devices 510*a-n* or a subset 540 of devices 510*a, b*. Each device having an on-device GNSS LCE 510*a, c* may be configured to perform its own on-device error calculations based on the positioning information received from other devices (as well as its own positioning information), and may be configured to send out correction data to other devices via network 520, which may be to all devices 510*a-n* or a subset 540 of devices 510*a, b*. Error corrections received by each device may be incorporated into that device's next on-device calculations along with positioning information. In this manner, positional accuracy of each device in the network (or subset) is improved through iterative improvements in error corrections across the devices 510*a-n* (or subset 540 of devices 510*a, b*). Connections of each device to network 520 may be of any appropriate type (e.g., Bluetooth, WiFi, cellular data, etc.). Establishment of the network of GNSS devices may be accomplished by installing applications, operating system functionality, or firmware on each device configured to communicate with other devices via network 420. Subsets 440 of devices (e.g., 410*a, b*) may be selected based on similar characteristics such as geographical proximity, device type, operating system, antenna type, GNSS chipset, device orientation, device movement, etc., as described above. Further, in this hybrid implementation, some devices, particularly those not having on-device GNSS LCEs (e.g., 510*b, n*) may be configured to receive correction data from GNSS LCE 560 on a cloud-based service 550, in which case network 520 further comprises access to the Internet to facilitate access to cloud-based service 550.

Hybrid implementations are advantageous in certain situations such as where some devices have on-device GNSS LCEs and others do not (e.g., where there is a substantial disparity in on-device processing power), where a portion of the location correction calculations are better offloaded to more powerful cloud-based processing (e.g., for solving complex algorithms involving positions of multiple receivers over time), and for battery usage optimization (e.g., where battery power draw to communicate with cloud-based service 550 is less than battery power draw to perform GNSS LCE processing).

Figure 6:
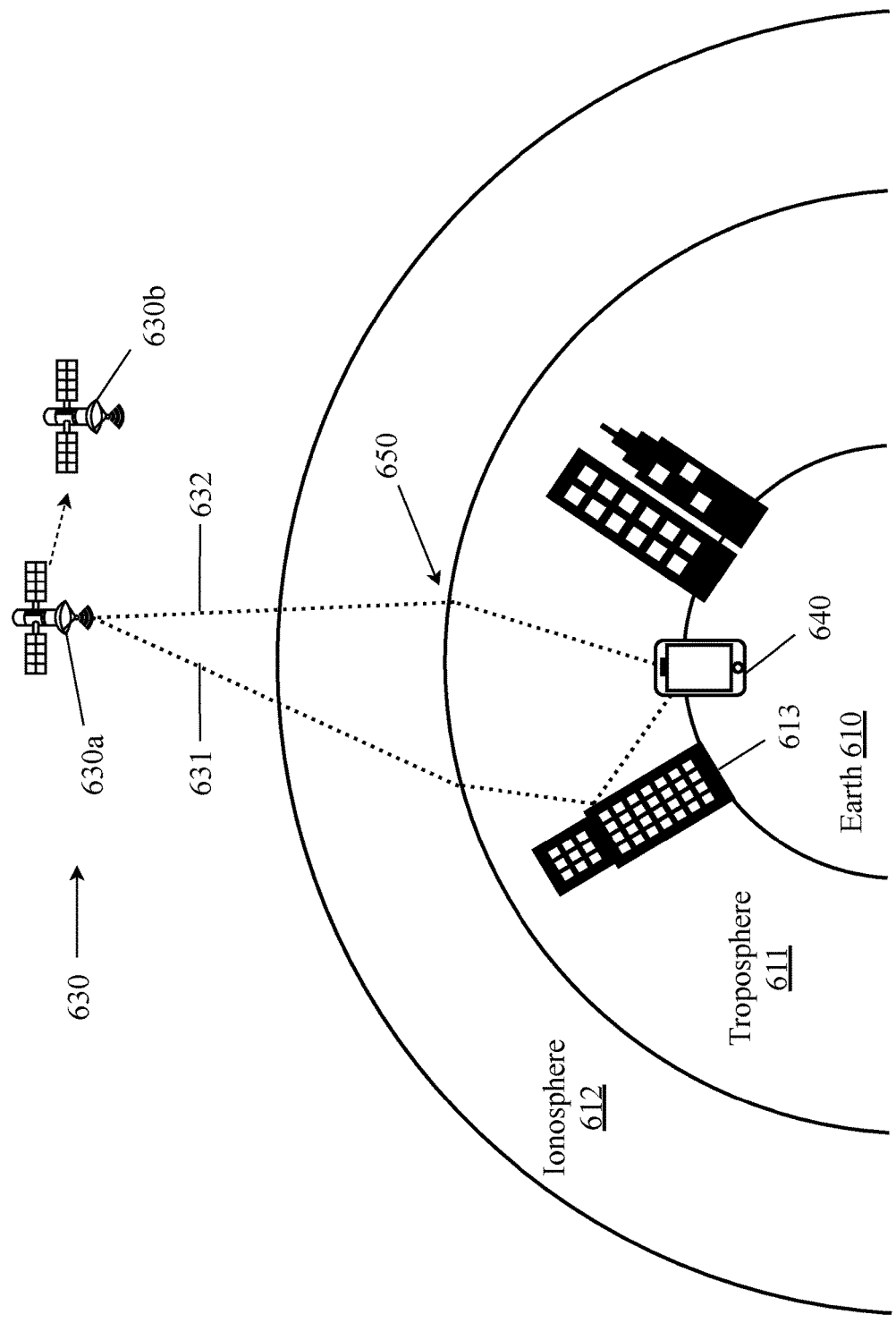
FIG. 6 (PRIOR ART) is a diagram illustrating some of the sources of error in GNSS location accuracy.

FIG. 6 (PRIOR ART) is a diagram illustrating some of the sources of error in GNSS location accuracy. Here, a GNSS satellite 630 is shown transmitting signals to the GNSS device 640. One source of error is clock error, which can cause satellite 630 to appear to GNSS device 640 to be at an inaccurate location 630*b* instead of at its true location 630*a*. Clock errors can cause positional accuracy errors at a GNSS device on the order of 1 to 3 meters. Another source of error are atmospheric errors, and particularly changes in the ionosphere 612, the upper layer of the Earth's 610 atmosphere that is ionized by radiation from the sun. Changes in iononization occur in day/night cycles, seasonal cycles, and with changes in solar activity (e.g., solar flares). Iononization delays the propagation of satellite signals, causing timing inaccuracies and refraction at the boundary 650 between the ionosphere 612 and the troposphere 611 of the Earth 610, also causing satellite 630 to appear to GNSS device 640 to be at an inaccurate location 630*b* instead of at its true location 630*a*. Atmospheric errors can cause positional accuracy errors at a GNSS device on the order of 5 to 10 meters. Atmospheric errors can be nearly eliminated by using dual frequency satellite signals, but this feature is not yet fully implemented on all GNSS systems and relatively few consumer-grade GNSS devices have dual-frequency capability. Both of these non-device-specific types of errors are monitored from ground stations of the GNSS and corrections are transmitted to the GNSS satellites for inclusion in the navigation message data they transmit to GNSS devices. However, the corrections sent by the ground stations are periodic, so there is still room for improved correction based on the ensemble correction methodologies described herein.

Another significant source of error is the device-specific (or more specifically, location-specific) problem of multipath signal errors. This problem occurs due to reflections of satellite signals from hard surfaces such as buildings. Here, for example, GNSS device 640 receives a signal directly 632 from satellite 630, but also receives the same signal as a reflection 631 from a tall building 613 having a longer transmission path. As the timestamp of the received signal is the same, GNSS device may not be able to distinguish whether directly-received signal 632 or reflected signal 631 is the proper signal. Multi-path errors can cause positional accuracy errors at a GNSS device on the order of 1 to 3 meters.

Figure 7:
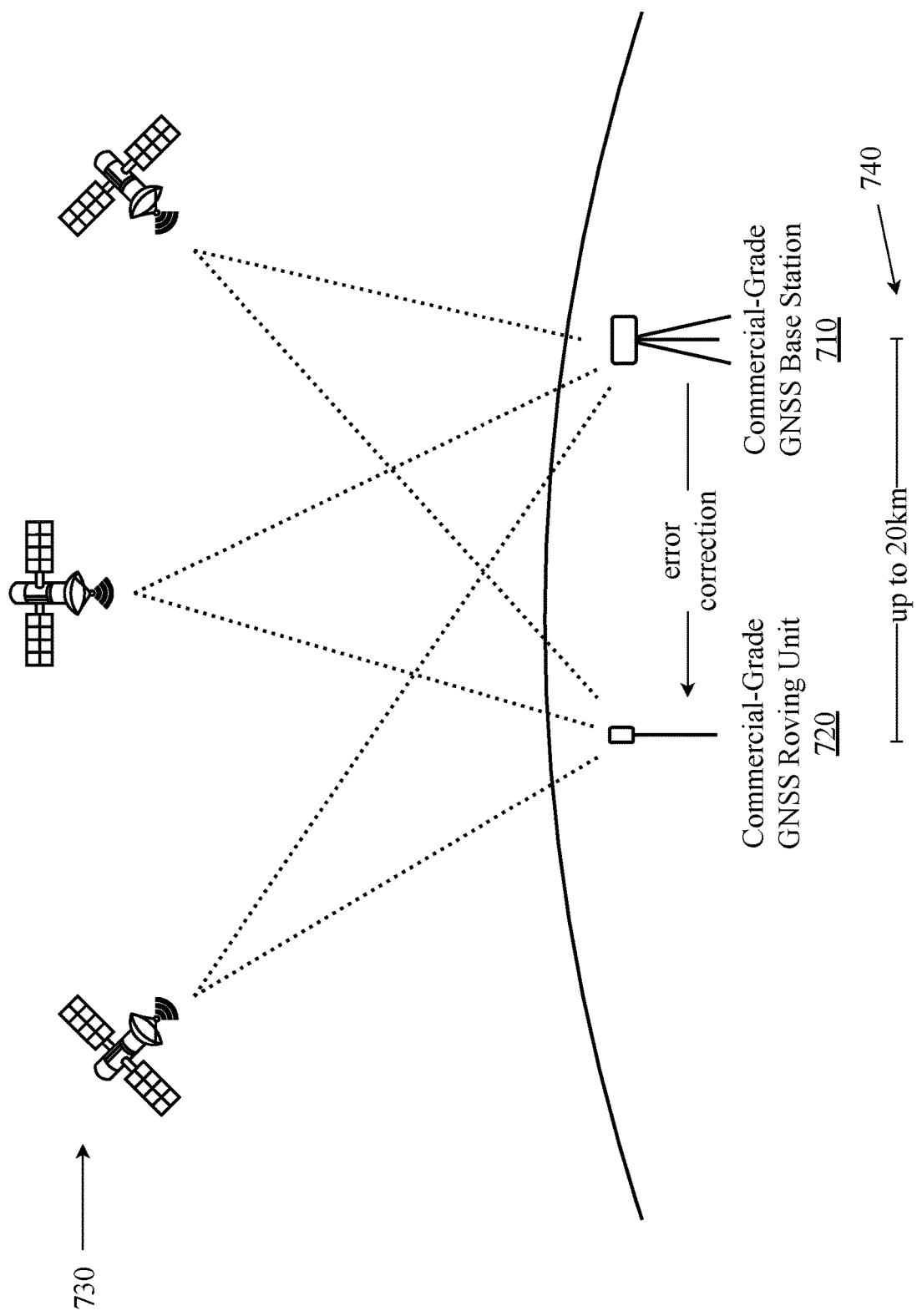
FIG. 7 (PRIOR ART) is a diagram illustrating correction of sources of error in GNSS location accuracy using a base station with commercial-grade GNSS surveying equipment.

FIG. 7 (PRIOR ART) is a diagram illustrating correction of sources of error in GNSS location accuracy using a base station with commercial-grade GNSS surveying equipment. Commercial-grade GNSS surveying equipment corrects for the positioning accuracy errors described above through use of a fixed base station 710 which remains in place throughout a given surveying project combined with a movable roving unit 720. Both fixed base station 710 and roving unit 720 are purpose-built GNSS devices with dedicated GNSS antennas and other hardware designed to maximize positional accuracy from signals from GNSS satellites 730. The inherent accuracy of both devices 710, 720 combined with the fixed location of base station 710 allows base station 720 to calculate and transmit correction data (typically at UHF 400-475 MHz or VHF 170-220 MHz frequencies) to roving unit 720 with sufficient accuracy to provide positional accuracy at roving unit 720 of 1 cm to 5 cm. While this approach provides tremendous accuracy, it has several disadvantages. First, this approach requires a fixed base station with GNSS capabilities located within about 20 km 740 of the mobile GNSS device. Second, it requires direct communication between the fixed base station and the mobile GNSS device. Third, there is considerable interference at the frequencies used (allocated by the Federal Communications Commission (FCC) in the U.S. for this purpose) where multiple base stations are located in the same area. These disadvantages make this approach to improving GNSS positional accuracy unsuitable for wide-spread consumer use where the vast majority of devices are consumer-grade GNSS devices (and primarily mobile phones).

Figure 8:
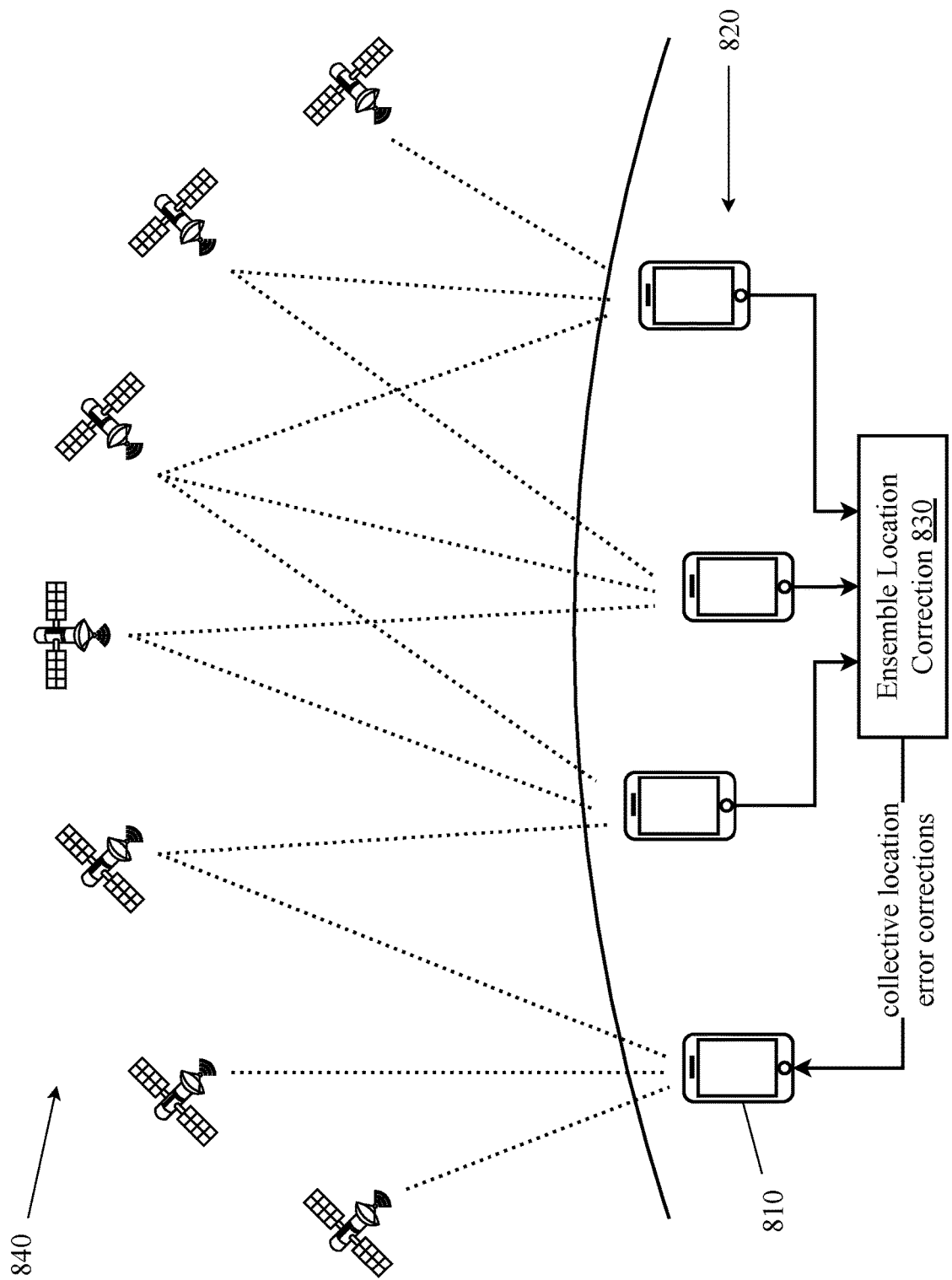
FIG. 8 is a diagram illustrating correction of sources of error in GNSS location accuracy using consumer-grade GNSS devices.

FIG. 8 is a diagram illustrating correction of sources of error in GNSS location accuracy using consumer-grade GNSS devices. In this approach, a network of consumer-grade GNSS devices 810, 820 are used to collect and provide positional information (navigational message data and/or other positional information) in a given geographical area based on their individual receipt of signals from GNSS satellites 840 (which do not necessarily have to be from the same GNSS system). The positional information from each individual GNSS device 810, 820 is combined into an ensemble location correction 830 and collective location error corrections are sent to one or more GNSS devices 810 of the network to improve the positional accuracy of the one or more GNSS devices 810. This methodology has advantages over existing GNSS correction methods in that it does not require the use of a base station, does not require direct communication with a base station or other device, is not subject to communication interference with other devices using the same technology, and does not require any purpose-built or commercial-grade GNSS devices (i.e., the methodology can be used to improve positional accuracy of consumer-grade GNSS devices using other consumer-grade GNSS devices, with none of them having specialized hardware).

Figure 9:
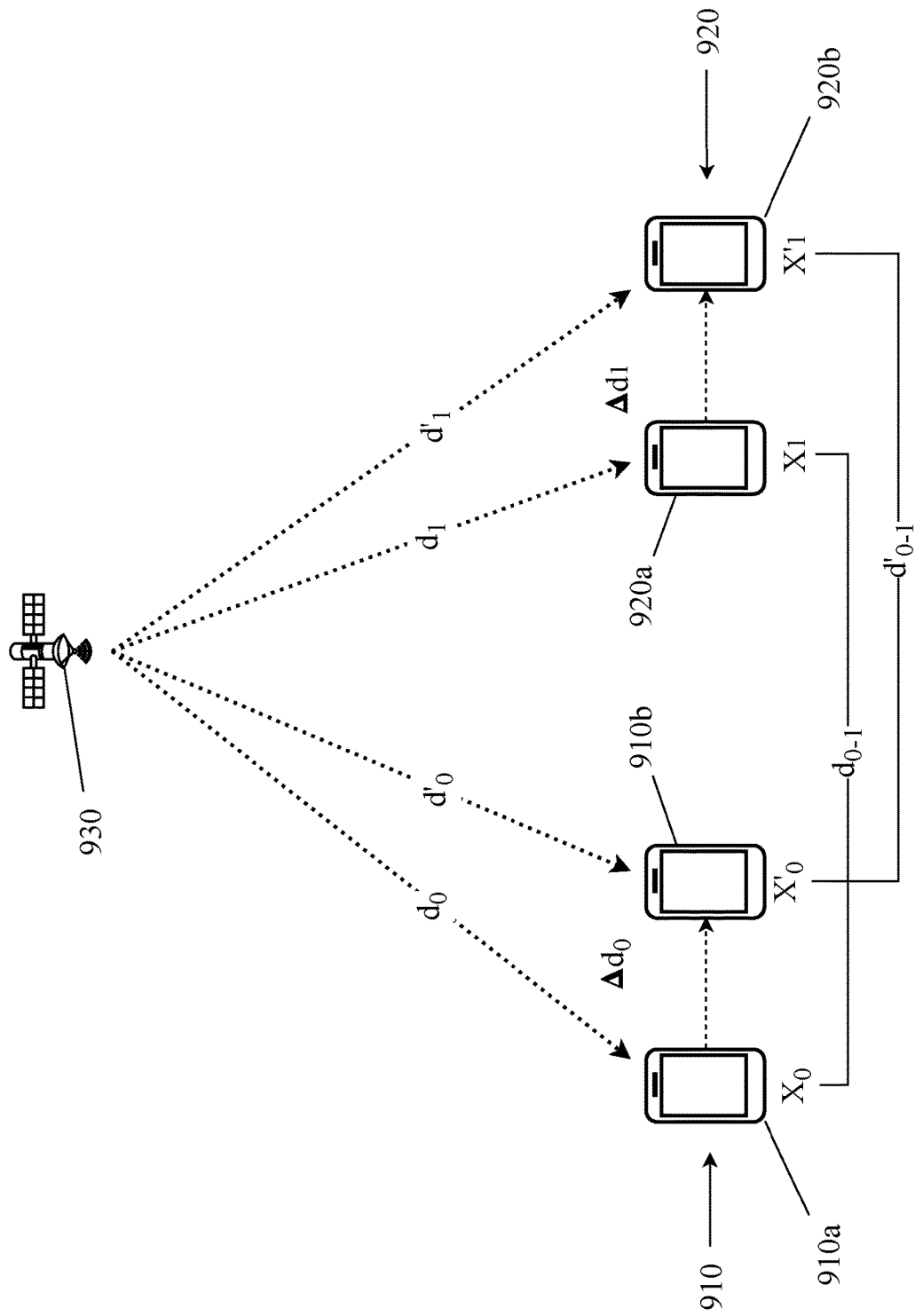
FIG. 9 is a diagram illustrating an exemplary algorithm for GNSS location correction based on positional information of two consumer-grade mobile GNSS devices over a period of time.

FIG. 9 is a diagram illustrating an exemplary algorithm for GNSS location correction based on positional information of two consumer-grade mobile GNSS devices over a period of time. This exemplary algorithm is a decomposition of a multi-receiver collective optimization problem into a simpler problem wherein the location of two GNSS devices 910, 920 are determined through shared positional information for two time periods.

Here, $X_0$ 910a is the location of a first GNSS device 910 at time $t_0$. $X'_0$ is the location of first GNSS device 910 at time $t_1$. $D_0$ is the satellite signal received by first GNSS device 910 from GNSS satellite 930 at time $t_0$. $D'_0$ is the satellite signal received by first GNSS device 910 from GNSS satellite 930 at time $t_1$. Mo is change in physical location of first GNSS device 910 from time $t_0$ to time $t_1$. $D_{0-1}$ is the distance (including direction) from first GNSS device 910 to a second GNSS device 920 at time $t_0$.

$X_1$ 920a is the location of a second GNSS device 920 at time $t_0$. $X'_1$ is the location of second GNSS device 920 at time $t_1$. $D_1$ is the satellite signal received by second GNSS device 920 from GNSS satellite 930 at time $t_0$. $D'_1$ is the satellite signal received by second GNSS device 920 from GNSS satellite 930 at time $t_1$. Mi is change in physical location of second GNSS device 920 from time $t_0$ to time $t_1$. $D'_{0-1}$ is the distance (including direction) from first GNSS device 910 to second GNSS device 920 at time $t_0$.

In this deconstructed example, assuming that $X_0$ 910a is known, the positional accuracy of $X'_1$ 920a can be substantially improved by solving an optimization problem involving the error corrections (atmospheric and clock/timing error corrections) contained in the navigation message data in signals $d_0$, $d'_0$, $d_1$, and $d'_1$ that solves for $d'_{0-1}$. The problem is non-linear because each calculated correction for each GNSS device affects the calculated correction for the other GNSS device, so the potential solutions increase exponentially as the number of devices increases. With only two GNSS devices, the solution is not difficult to calculate.

Extending this algorithm to the case where a large number of GNSS devices are providing data, assuming that $X_0$ is known, the positional accuracy of second GNSS device 920 at $X_1$ 920a can be corrected to centimeter-level accuracy using the same technique, but applied to the large number of GNSS devices. Here, the error corrections contained in the navigation message data of all GNSS devices are incorporated into an optimization problem which, when solved, converges on the true value of $d_{0-1}$ without knowing the receiver positions of any of the GNSS devices other than first GNSS device 910 at $X_0$. This is a full non-linear optimization problem that incorporates common and correlated parameters across devices wherein each calculated solution for each GNSS device affects the calculated solutions for each other GNSS device. The solution to this problem can be obtained by using computationally intensive optimizers such as Stochastic Gradient Descent (SGD) variants (for example Adam) and Trust-region/line-search non-linear solvers (for example Ceres, and Interior Point OPTimizer (IPOPT)). When this algorithm is implemented as a persistent external service, the system can continuously maintain correction states across the collection of devices, thereby keeping the initial convergence time small.

More generally, the optimization problem is a triangulation problem which will have a bunch of terms of the form: (x_satellite−x_receiver)^2+(y_satellite−y_receiver)^2+ (z_satellite−z_receiver)^2−distance^2+ . . . . So, while minimization of this triangulation problem is technically a non-linear computation, in its simplest form it is a linear least squares problem and could, in practice, be solved converting it to a linear matrix equation and solving that equation. Additional non-linearity is added to the optimization problem when corrections having more complicated derivatives are added to the distances, which makes the optimization problem more difficult to solve. However, approaches to solving this optimization problem include, but are not limited to algorithms which iterate over linearized versions of the non-linear objective of the problem such as gradient descent, Gauss-Newton, and Levenberg-Marquart algorithms. Thus, the optimization problem can be solved using either linear or non-linear algorithms.

Thus, unlike traditional error correction solutions which solve for a single GNSS device, the methodology described herein solves for the error inherent in a GNSS based location solution using metadata on ephemeris, ionosphere, troposphere, satellite clock, multipath error, and antenna calibration error, while being resilient to carrier-phase cycle slip.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
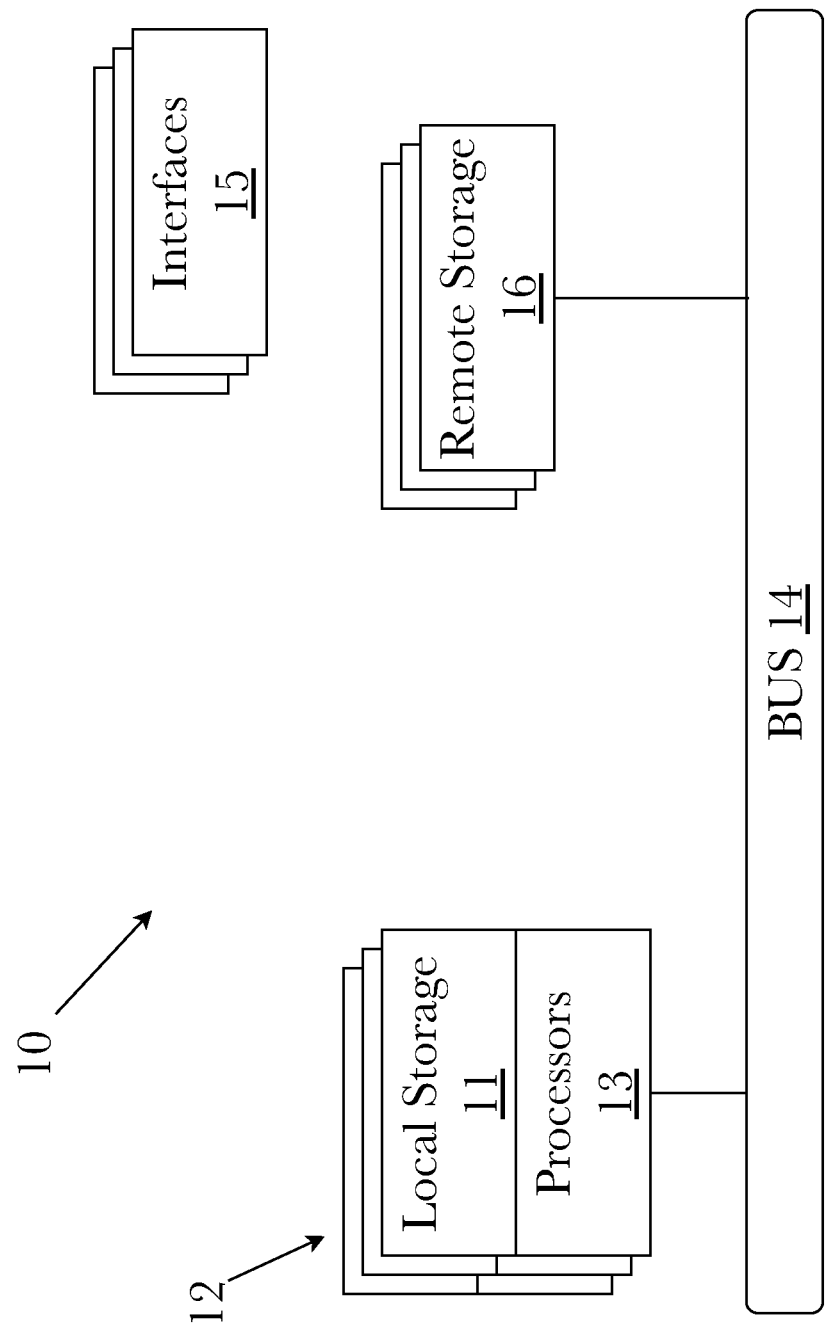
FIG. 10 is a block diagram illustrating an exemplary hardware architecture of a computing device.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
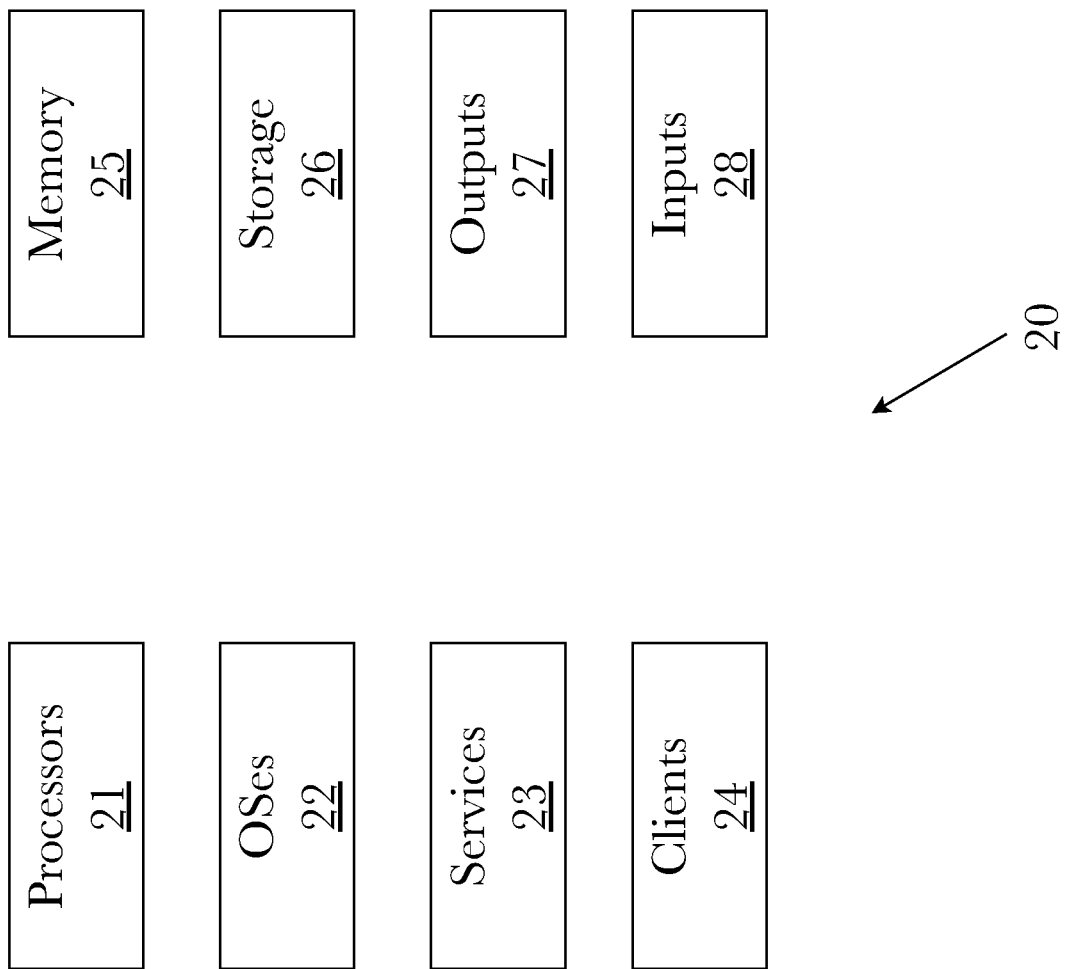
FIG. 11 is a block diagram illustrating an exemplary logical architecture for a client device.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

In some aspects, systems may be implemented on a distributed computing network, such as one having any number of clients and/or servers.

Figure 12:
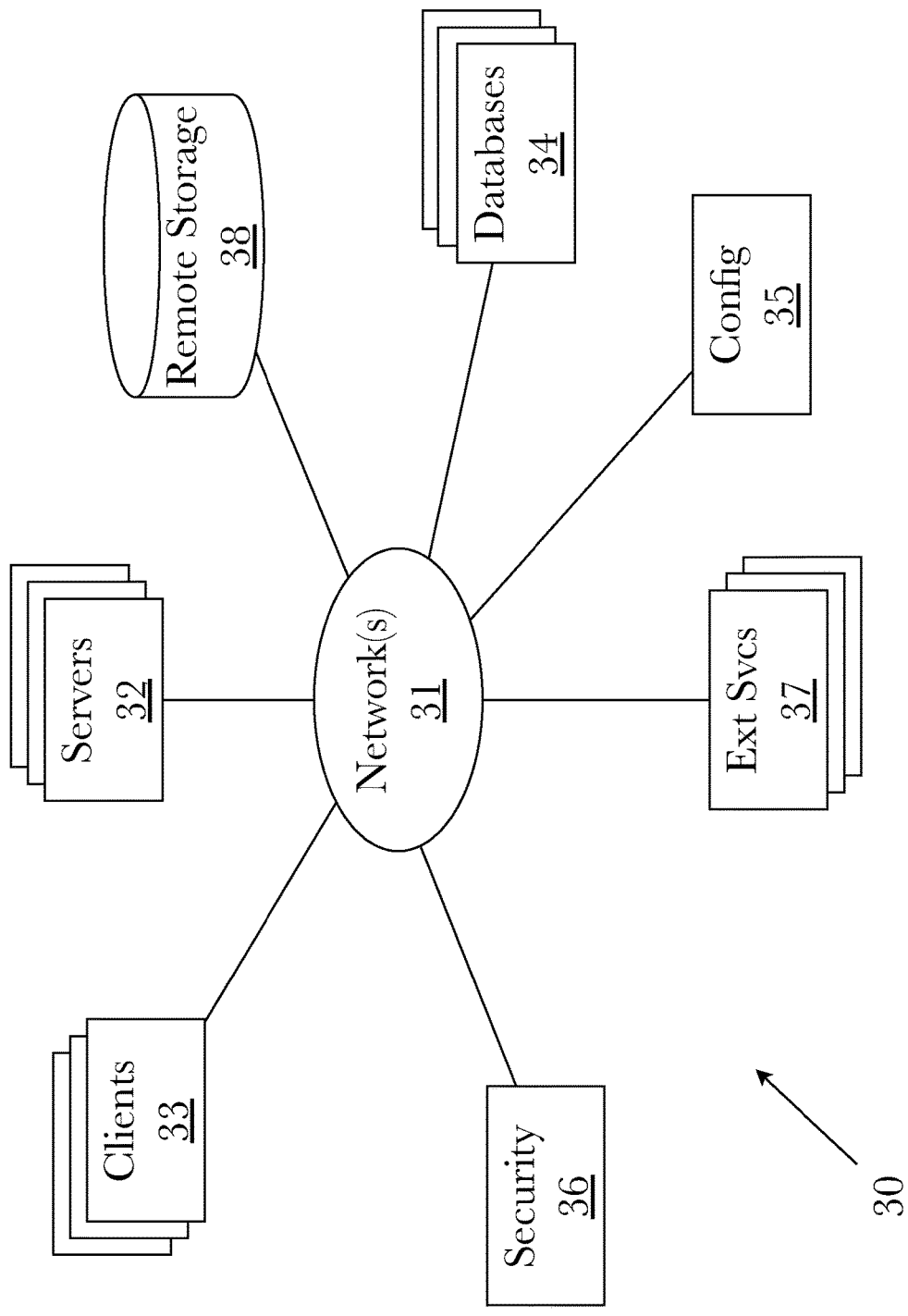
FIG. 12 is a block diagram showing an exemplary architectural arrangement of clients, servers, and external services.

Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
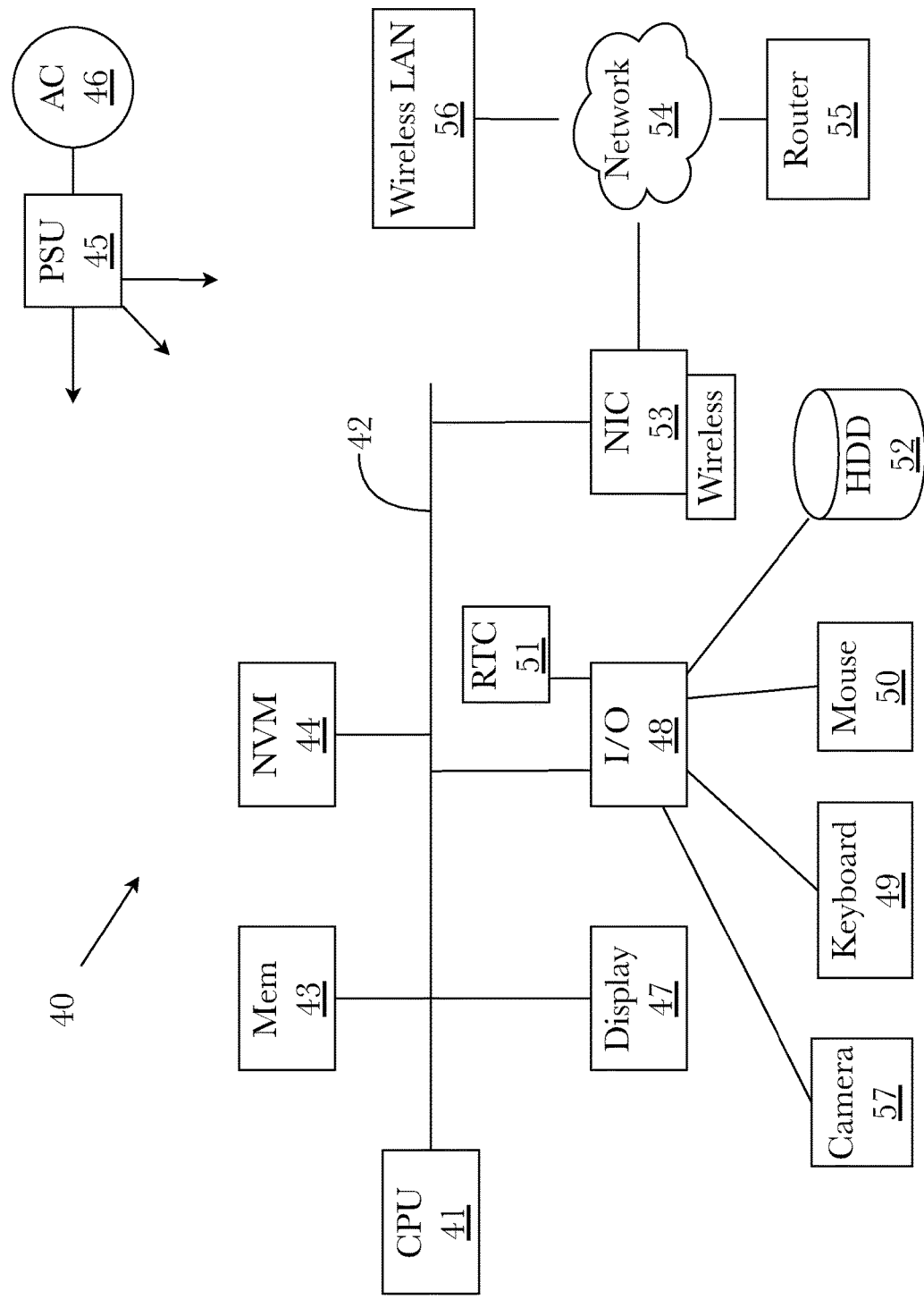
FIG. 13 is another block diagram illustrating an exemplary hardware architecture of a computing device.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A method for improving positional accuracy in a Global Navigation Satellite System (GNSS)-equipped mobile end user device, comprising the steps of:
   on a first GNSS-equipped mobile end user device, receiving positional information from a plurality of other GNSS-equipped mobile end user devices, the positional information comprising navigation message data from each device comprising an error correction to be applied by that device to correct its calculated physical location;
   selecting a subset of the set comprising the first GNSS-equipped mobile end user device and the plurality of other GNSS-equipped mobile end user devices, wherein the subset is selected based on similarity of one or more characteristics with a target GNSS-equipped mobile end user device;
   calculating an error correction for the target GNSS-equipped mobile end user device based on the positional information of the GNSS-equipped mobile end user devices in the subset using an ensemble location correction algorithm; and
   sending the error correction to the target GNSS-equipped mobile end user device.

2. The method of claim 1, further comprising the steps of:
   sending the positional information to a cloud-based service;
   using computing resources of the cloud-based service to solve an optimization problem for the subset using the positional information of the devices in the subset which, when solved, converges on the true value of the distance from a known location of one of the plurality subset of GNSS-equipped mobile end user devices to the target GNSS-equipped mobile end user device;
   calculating the error correction for the target GNSS device based on the solution to the optimization problem; and
   sending the error correction to the target GNSS-equipped mobile end user device.

3. The method of claim 2, wherein calculation of a location correction for any device in the subset affects calculation of the locations of the remainder of the GNSS-equipped mobile end user devices in the subset.

4. The method of claim 2, further comprising the steps of:
   connecting the plurality of GNSS-equipped mobile end user devices into a decentralized, peer-to-peer network;

calculating a first portion of the error correction for the target GNSS-equipped mobile end user device on one or more of the plurality of GNSS-equipped mobile end user devices;

calculating a second portion of the error correction on the cloud-based service;

combining the first and second portions of the error correction into the error correction; and sending the error correction to the target GNSS-equipped mobile end user device.

5. The method of claim 1, further comprising the steps of:

connecting the subset of GNSS-equipped mobile end user devices into a decentralized, peer-to-peer network;

calculating the error correction for the target GNSS-equipped mobile end user device on one or more of the subset of GNSS-equipped mobile end user devices; and distributing the error correction to each of the other GNSS-equipped mobile end user devices of the subset of devices and to the target GNSS-equipped mobile end user device.

6. The method of claim 1, wherein the target device is one of the plurality of GNSS-equipped mobile end user devices.

7. The method of claim 1, wherein the target device is not one of the plurality of GNSS-equipped mobile end user devices.

8. The method of claim 1, wherein the positional information further comprises the device's calculated physical location.

9. The method of claim 1, wherein the positional information further comprises information from an inertial measurement unit (IMU) on each device.

* * * * *